(12) United States Patent
Khoshaba et al.

(10) Patent No.: US 8,538,491 B2
(45) Date of Patent: Sep. 17, 2013

(54) SYSTEM AND METHOD FOR SPOKEN CALLER IDENTIFICATION IN A CELLULAR TELEPHONE HEADSET

(71) Applicant: AT&T Intellectual Property I, LP, Atlanta, GA (US)

(72) Inventors: Shadi Khoshaba, Skokie, IL (US); Bruce Barnes, Crystal Lake, IL (US); Tyrone Curtin, Buffalo Grove, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 13/782,342

(22) Filed: Mar. 1, 2013

(65) Prior Publication Data

US 2013/0178250 A1    Jul. 11, 2013

Related U.S. Application Data

(63) Continuation of application No. 11/746,417, filed on May 9, 2007, now Pat. No. 8,412,284.

(51) Int. Cl.
*H04M 1/00*        (2006.01)

(52) U.S. Cl.
USPC .................. 455/569.1; 455/414.1; 455/575.2; 455/412.1; 455/412.2; 455/415; 455/417; 455/88; 455/466; 455/567

(58) Field of Classification Search
USPC ............. 455/414.1, 575.2, 412.1, 412.2, 415, 455/417, 88, 569.1, 567, 566
See application file for complete search history.

(56) References Cited

U.S. PATENT DOCUMENTS

| | | | |
|---|---|---|---|
| 4,899,358 | A | 2/1990 | Blakley |
| 4,922,490 | A | 5/1990 | Blakley |
| 5,475,738 | A | 12/1995 | Penzias |
| 5,796,806 | A | 8/1998 | Birckbichler |
| 5,950,123 | A | 9/1999 | Schwelb et al. |
| 6,249,808 | B1 | 6/2001 | Seshadri |
| 6,970,695 | B1 | 11/2005 | Luneau |
| 7,012,999 | B2 | 3/2006 | Ruckart |
| 7,065,185 | B1 | 6/2006 | Koch |
| 7,103,548 | B2 | 9/2006 | Squibbs et al. |
| 2001/0012348 | A1 | 8/2001 | Latter et al. |
| 2002/0107049 | A1 | 8/2002 | Maquaire et al. |
| 2004/0067751 | A1 | 4/2004 | Vandermeijden et al. |
| 2005/0233742 | A1 | 10/2005 | Karaoguz et al. |
| 2005/0266891 | A1 | 12/2005 | Mullen |
| 2006/0035688 | A1 | 2/2006 | Paho et al. |
| 2006/0045252 | A1 | 3/2006 | Gorti et al. |

(Continued)

OTHER PUBLICATIONS

"Jabra BT800 Bluetooth Heaset User Manual", 2004, 1-13.

*Primary Examiner* — Kwasi Karikari
(74) *Attorney, Agent, or Firm* — Guntin & Gust, PLC; Andrew Gust

(57) ABSTRACT

The subject disclosure describes monitoring when a headset is in communication with a mobile communication device, detecting the headset, comparing a name of a caller and a telephone number of the caller against a list of names and telephone numbers previously stored in a memory, determining that the name of the caller or the telephone number of the caller matches one of the names and telephone numbers in the list, determining that the one of the names and telephone numbers is associated with a pre-recorded message that the user previously recorded and stored in the memory, retrieving the pre-recorded message, and performing a text-to-speech conversion on the name and telephone number of the caller to generate a synthesized speech signal spoken text message and sending the synthesized speech signal and the pre-recorded message to the headset. Other embodiments are disclosed.

20 Claims, 3 Drawing Sheets

(56) References Cited

U.S. PATENT DOCUMENTS

| | | |
|---|---|---|
| 2006/0183513 A1 | 8/2006 | Slamka et al. |
| 2006/0251232 A1 | 11/2006 | Wuthnow et al. |
| 2006/0276210 A1 | 12/2006 | Thomas et al. |
| 2007/0205875 A1 | 9/2007 | De Haan |
| 2008/0113689 A1 | 5/2008 | Bailey |
| 2009/0111442 A1 | 4/2009 | Barnes et al. |

SYSTEM AND METHOD FOR SPOKEN CALLER IDENTIFICATION IN A CELLULAR TELEPHONE HEADSET

CROSS-REFERENCE TO RELATED APPLICATIONS

This application is a continuation of U.S. patent application Ser. No. 11/746,417 filed May 9, 2007 which is incorporated herein by reference in its entirety.

FIELD OF THE DISCLOSURE

The present disclosure generally relates to caller identification, and more particularly relates to spoken caller identification for a cellular telephone headset.

BACKGROUND OF THE DISCLOSURE

Incoming caller identification, a feature that displays the caller's number for incoming calls to a called customer, allows selective acceptance of certain calls based on the calling number while other calls are either not answered or are routed to a message center. The feature is implemented by transmitting the calling line identification to the called customer landline telephone or cellular telephone in a data message. The data message is displayed by the landline telephone or cellular telephone in a text format for the customer. Because customers typically remember only a few, frequently called telephone numbers, a feature that additionally provides the caller name is substantially more useful to customers in deciding whether to accept a call.

In a call announcement arrangement which is the subject of U.S. Pat. No. 4,899,358, the calling party name is obtained from a database search and a text-to-speech unit generates speech signals, rather than a data message, for transmission to the called landline telephone. The calling party name is spoken at the landline telephone instead of being displayed. For a conventional analog landline telephone, the name is spoken after the called party has answered in response to ringing at the landline telephone but before a connection is completed to the caller.

DETAILED DESCRIPTION OF THE DRAWINGS

Figure 1:
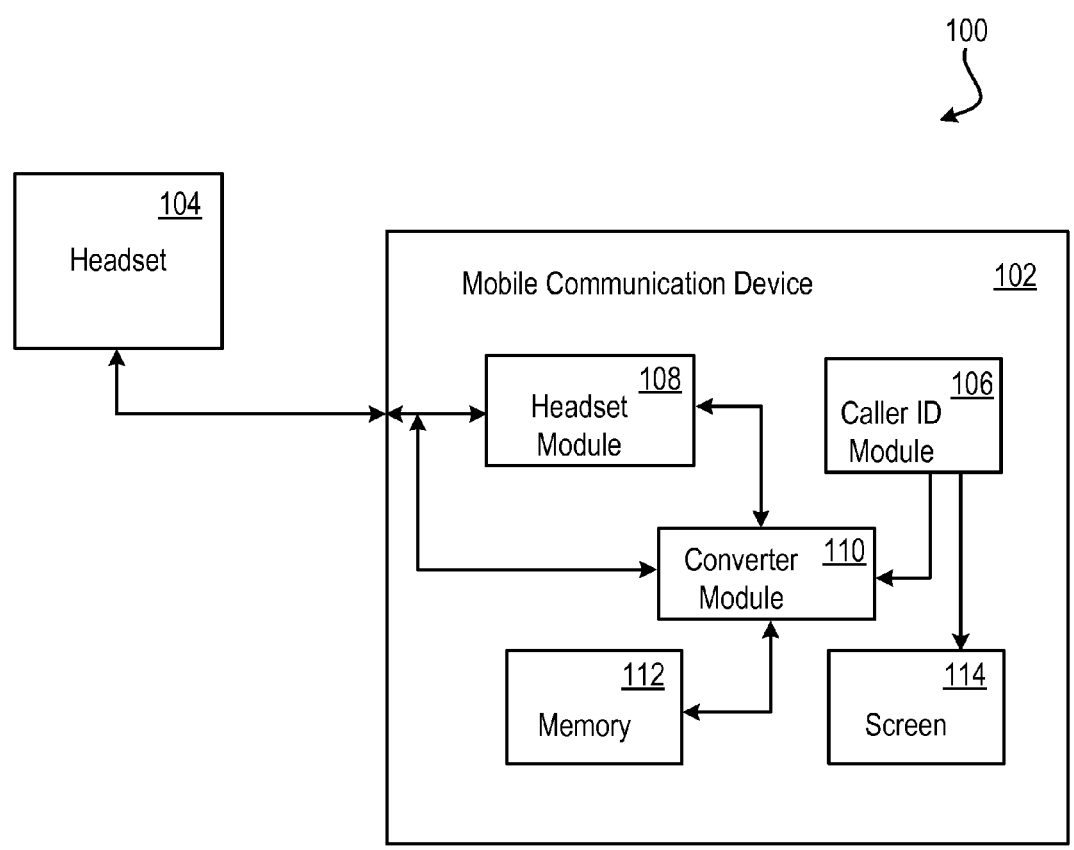
FIG. 1 is a block diagram of a spoken caller identification system.

FIG. 1 shows a block diagram of a spoken caller identification system 100 including a mobile communication device 102 and a headset 104. The mobile communication device 102 is preferably a cellular telephone, or any other portable device, having an associated telephone number. The mobile communication device 102 includes a caller identification module 106, a headset module 108, a converter module 110, and a memory 112. The headset 104 is preferably an earpiece worn by a user, a hands free vehicle communication system, or any other device capable of connecting with the mobile communication device 102. The mobile communication device 102 and the headset 104 communicate through a physical connection, or more preferably through a wireless connection such as an IEEE 802.11a/b/g compatible wireless fidelity (WiFi) connection or a wireless Bluetooth connection.

If the headset module 108 detects that the mobile communication device 102 is connected to the headset 104, the headset module sends an activation signal to the converter module 110. When the mobile communication device 102 receives an incoming telephone call, the caller identification module 106 extracts caller identification information, such as the telephone number and/or the caller's name, associated with the call. Regardless of whether the headset 104 is present, the caller identification module 106 preferably displays the caller identification information in a text format on a screen 114. If the converter module 110 is activated, however, it compares the calling party name and/or telephone number against a list of names and/or telephone numbers previously stored by the user in the memory 112. If there is an exact (or, if desired, a close) match to one of the names or telephone numbers stored in the memory 112, the converter module 110 retrieves the name associated with the telephone number in the memory 112.

The converter module 110 then performs a text-to-speech conversion on either the caller identification information as received from the caller identification module 106, or on the name stored by the user in the memory 112. The text-to-speech conversion converts the text received from the caller identification module 106 or the memory 112 into a synthesized speech signal that is then output to the headset 104. Alternatively, the user may pre-record a message (such as a name) associated with an entry in the memory 112, and the pre-recorded message may be output to the headset 104 in place of or in addition to the synthesized speech. All of these steps may be completed before the user answers the incoming telephone call.

The spoken caller identification system 100 may also identify the sender and/or text of an Instant Message sent to the mobile communication device 102. When the mobile communication device 102 receives an Instant Message, the mobile communication device performs the text-to-speech conversion on the caller identification for the Instant Message in the same manner as for a telephone call. Additionally, the mobile communication device 102 preferably performs the text-to-speech conversion on the Instant Message, wherein the entire Instant Message is played as a synthesized speech signal through the headset 104.

Figure 2:
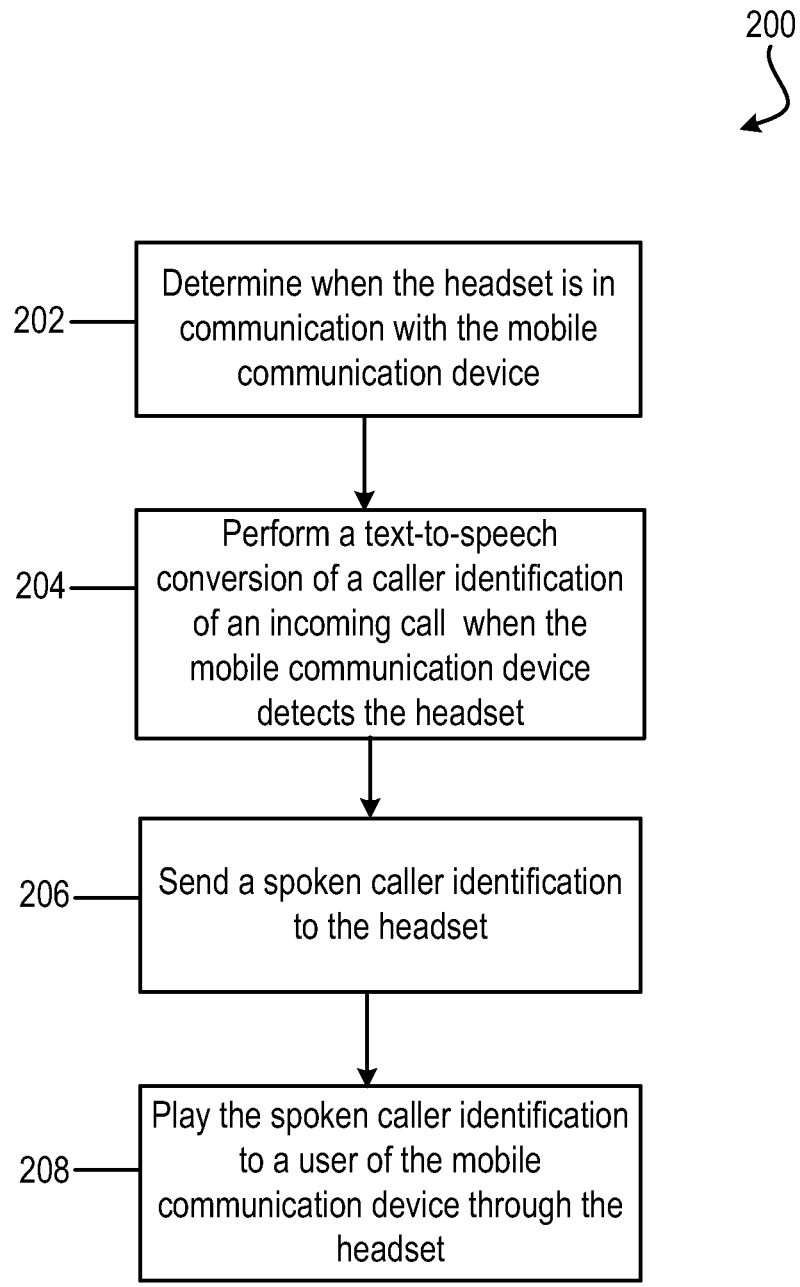
FIG. 2 is a flow chart of a method for providing a spoken caller identification through a headset of a mobile communication device.

FIG. 2 shows a flow chart of a method for providing spoken caller identification through a headset of a mobile communication device. At block 202, the mobile communication device determines if the headset is in communication with the mobile communication device. The mobile communication device performs a text-to-speech conversion on a caller identification for an incoming telephone call when the headset is in communication with the mobile communication at block 204. At block 206, the mobile communication device sends a spoken caller identification to the headset. The spoken caller identification is sent through a wireless or a physical connection. The headset plays the spoken caller identification to a user of the mobile communication at block 208.

Figure 3:
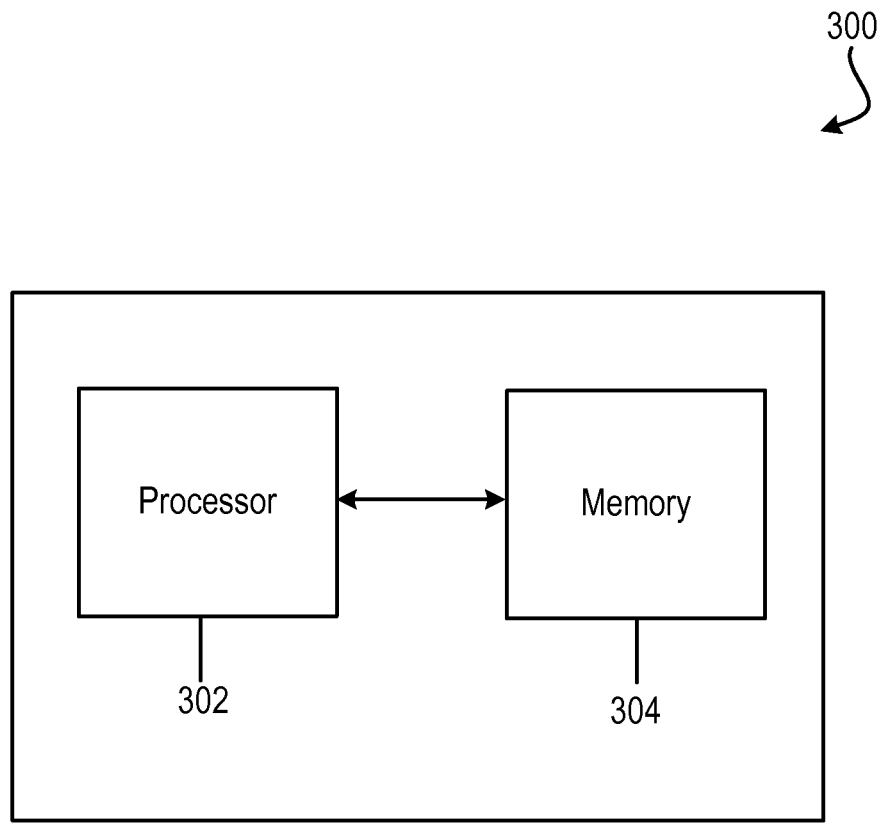
FIG. 3 is a block diagram of a data processing device.

FIG. 3 shows a block diagram of a data processing device 300 comprising a processor 302 and a computer-readable medium such as a memory 304. The memory 304 stores a set of instructions to manipulate the processor to perform the method 200 of FIG. 2 above. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosed subject matter is considered to include any one or more of a computer-readable medium or a distribution medium and other equivalents and successor media, in which data or instructions may be stored.

The spoken caller identification system 100 thus provides the user with a number of advantages. One advantage is that the user is able to determine the identity of the caller without having to look at a display screen of the mobile communication device. This ability allows the user to receive the spoken caller identification while moving around in proximity to, but not actually holding, the mobile communication device 102. Also, if the user is driving a vehicle or carrying the mobile communication device 102 under clothing, in a pocket, or in a purse, then the user does not have to search for the mobile communication device to determine the caller identification of the incoming call.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the FIGs. are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A mobile communication device, comprising:
   a headset module for detecting a headset in communication with the mobile communication device;
   a memory to store instructions; and
   a processor coupled to the memory and the headset module, wherein responsive to executing the instructions, the processor performs operations comprising:
   monitoring whether a headset is in communication with the mobile communication device;
   detecting that the headset is in communication with the mobile communication device;
   detecting an incoming telephone call comprising a caller identification including a name of a caller and a telephone number of the caller;
   comparing the name of the caller and the telephone number of the caller against a list of names and telephone numbers previously stored by a user in a memory of the mobile communication device;
   determining that the name of the caller or the telephone number of the caller matches one of the names and telephone numbers in the list of names and telephone numbers;
   determining that the one of the names and telephone numbers in the list of names and telephone numbers is associated with a pre-recorded message that the user previously recorded and stored in the memory;
   converting the name and telephone number of the caller into a synthesized speech signal; and
   sending the pre-recorded message and the synthesized speech signal to the headset upon a determination that the headset is in communication with the mobile communication device.

2. The mobile communication device of claim 1, wherein the mobile communication device comprises a converter module in communication with the headset module, wherein the converter module generates the synthesized speech signal and sends the synthesized speech signal to the headset when the headset is in communication with the mobile communication device, and wherein the mobile communication device comprises a cellular telephone.

3. The mobile communication device of claim 1, wherein the communication between the headset and the mobile communication device is through a wireless connection.

4. The mobile communication device of claim 1, wherein the communication between the headset and the mobile communication device is through a physical connection.

5. The mobile communication device of claim 1, wherein the headset is an earpiece.

6. The mobile communication device of claim 1, wherein the headset is a hands free vehicle communication system.

7. A method for providing caller identification, the method comprising:
monitoring, by a mobile communication device comprising a processor, whether a headset is in communication with the mobile communication device;
detecting, by the mobile communication device, that the headset is in communication with the mobile communication device;
detecting, by the mobile communication device, an incoming telephone call comprising a caller identification including a name of a caller and a telephone number of the caller;
comparing, by the mobile communication device, the name of the caller and the telephone number of the caller against a list of names and telephone numbers previously stored by a user in a memory of the mobile communication device;
determining, by the mobile communication device, that the name of the caller or the telephone number of the caller matches the one of the names and telephone numbers in the list of names and telephone numbers;
retrieving, by the mobile communication device, a pre-recorded message associated with the one of the names and telephone numbers in the list of names and telephone numbers from the memory;
performing, by the mobile communication device, a text-to-speech conversion on the name and telephone number of the caller to get a spoken caller identification when the headset is in communication with the mobile communication device;
sending, by the mobile communication device, the spoken caller identification and the pre-recorded message to the headset; and
playing, by the mobile communication device, the spoken caller identification text message and the pre-recorded message to the user of the mobile communication device through the headset.

8. The method of claim 7, wherein the headset is in communication with the mobile communication device through a wireless connection.

9. The method of claim 7, wherein the headset is in communication with the mobile communication device through a physical connection.

10. The method of claim 7, wherein the headset comprises an earpiece.

11. The method of claim 7, wherein the headset comprises a hands free vehicle communication system.

12. The method of claim 7, wherein the headset comprises a Bluetooth headset.

13. The method of claim 7, wherein the text-to-speech conversion is performed on one of the names and telephone numbers in the list of names and telephone numbers stored on the memory of the mobile communication device.

14. A mobile communication device for providing a spoken caller identification of a caller to a user, the mobile communication device comprising:
a headset module;
a converter module in communication with the headset module;
a memory to store instructions; and
a processor coupled to the headset module, the converter module and the memory, wherein responsive to executing instructions, the processor performs operations comprising:
monitoring when a headset is in communication with the mobile communication device;
detecting the headset;
detecting an incoming telephone call comprising a caller identification including a name of a caller and a telephone number of the caller;
comparing the name of the caller and the telephone number of the caller against a list of names and telephone numbers previously stored by the user in the memory of the mobile communication device;
determining that the name of the caller or the telephone number of the caller matches one of the names and telephone numbers in the list of names and telephone numbers;
determining that the one of the names and telephone numbers in the list of names and telephone numbers is associated with a pre-recorded message that the user previously recorded and stored in the memory;
retrieving the pre-recorded message from the memory;
performing a text-to-speech conversion on the name and telephone number of the caller to generate a synthesized speech signal spoken text message; and
sending the synthesized speech signal and the pre-recorded message to the headset when the headset is in communication with the mobile communication device.

15. The mobile communication device of claim 14, wherein the headset comprises a Bluetooth headset.

16. The mobile communication device of claim 14, wherein the headset comprises a wireless headset.

17. The mobile communication device of claim 14, wherein the communication with the headset is through a wireless connection.

18. The mobile communication device of claim 14, wherein the communication with the headset is through a physical connection.

19. The mobile communication device of claim 14, wherein the headset comprises an earpiece.

20. The mobile communication device of claim 14, wherein the headset comprises a hands free vehicle communication system.

* * * * *